United States Patent [19]
Hillman

[11] 3,871,220
[45] Mar. 18, 1975

[54] WIND VELOCITY AND DIRECTION APPARATUS

[76] Inventor: Edwin K. Hillman, 907 W. Desert Cove, Phoeniz, Ariz. 85029

[22] Filed: Jan. 2, 1974

[21] Appl. No.: 429,492

[52] U.S. Cl. ................................................. 73/189
[51] Int. Cl. ............................................. G01w 1/02
[58] Field of Search ............. 73/189, 188, 186, 184, 73/228

[56] References Cited
UNITED STATES PATENTS
| | | | |
|---|---|---|---|
| 685,590 | 10/1901 | Faltermayer | 73/188 |
| 1,736,109 | 11/1929 | Barton | 73/189 |
| 1,968,838 | 8/1934 | Lanagan | 73/189 |

FOREIGN PATENTS OR APPLICATIONS
| | | | |
|---|---|---|---|
| 263,191 | 6/1970 | U.S.S.R. | 73/228 |

Primary Examiner—James J. Gill
Assistant Examiner—Anthony V. Ciarlante

[57] ABSTRACT

Apparatus is disclosed for capturing the wind in a fabric body which fabric body is responsive to wind direction changes and velocity. The fabric body is able to rotate about a mast in response to wind direction changes. The fabric body is also at the same time responsive to wind velocity. The more wind pressure that is able to fill the fabric body, this pressure causes a sliding collar to move a contactor and also a coil within a housing to give a visual readout on appropriate equipment. The apparatus is mounted substantially above ground level to take full advantage of the wind gradient.

9 Claims, 5 Drawing Figures

PATENTED MAR 18 1975 3,871,220

WIND VELOCITY AND DIRECTION APPARATUS

The present invention relates to apparatus for capturing the force of the wind, and more particularily, to apparatus presenting a varying surface for engaging the wind.

Many successful apparatus have been developed for taking the measurement of wind velocity or direction but each of these take a separate apparatus for each function. Perhaps the best known device is the anemometer and it is widely used for wind speed measurement but this device functions best in this area only.

Variations on the above discussed types of wind-driven apparati have also been developed. One of the most notable developments is that of a device functioning similarly to an anemometer but having its arms either curved of dished whereby the wind coacts with one half of the apparatus with greater force than the other half. However, each of these types of apparatus include non-varying surface area elements extending from a hub, whether that hub be in the vertical or horizontal axis.

It is therefore a primary object of the present invention to provide a combination wind velocity and direction responsive indicator.

Another object of my invention is to provide a means for varying the area of the surfaces subjected to the force of the wind as a function of the rotational position of the combination wind velocity and direction responsive indicator.

A yet another object of the present invention is to provide a means for orientating the combination wind velocity and direction responsive indicator with respect to the eye of the wind.

A still another object of the present invention is to provide means which moves the contactor to indicate electrically the direction of the wind.

A further object of the present invention is to provide means for measuring the wind velocity.

A still further object of the present invention is to provide means for the return of the apparatus to normal position after the winds subside.

These and other objects of the invention will become more readily apparent to those skilled in the art as the description thereof proceeds.

The present invention may be described with more specificity and clarity with reference to the following drawings, in which.

Figure 1:
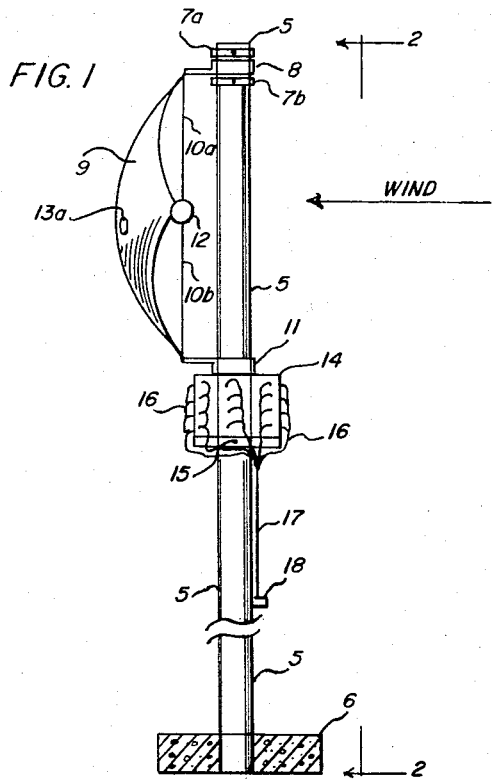
FIG. 1 illustrates a cross-sectional view of the present invention.

In the following discussion describing the present invention, reference will be made to FIG. 1. The present invention is supported above the ground by a mast 5. The base of mast 5 is anchored to the ground by concrete 6. Collar 7a and collar 7b supplied with set screws position the movable collar 8 on mast 5. Fabric body 9 and cable 10a are fixed to movable collar 8. Fabric body 9 and cable 10b is fixed to indicator collar 11. Fabric body 9, cables 10a and cable 10b are fixed to rod 12 at one end of the extreme point of rod 12.

Opening 13a in fabric body 9 will be discussed later in the present invention. Housing 14 is circular in shape and is secured to mast 5 by set screw 15. Wires 16 extend from within housing 14 and form a harness 17 which is terminated at a jack 18.

Figure 2:
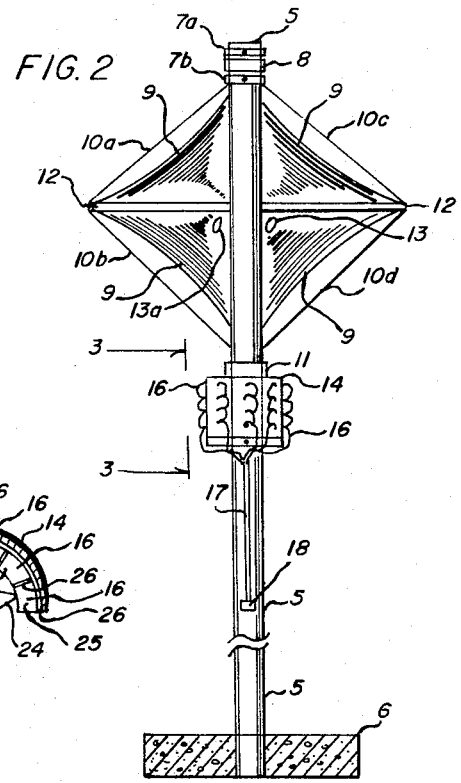
FIG. 2 illustrates a cross-sectional view of the present invention, taken along lines 2—2 as shown in FIG. 1.

Further discussion of the present invention will show in FIG. 2 the fabric body 9 capturing the force of the wind. Fabric body 9 and cables 10c and cable 10d are fixed to rod 12 at the extreme point of rod 12. Cable 10c is fixed to movable collar 8 at the same point that cable 10a is as shown in FIG. 1. Cable 10d is fixed to indicator collar 11 at the same point that cable 10b as shown in FIG. 1. Opening 13a and 13b in fabric body 9 will be discussed later in the present invention.

Figure 3:
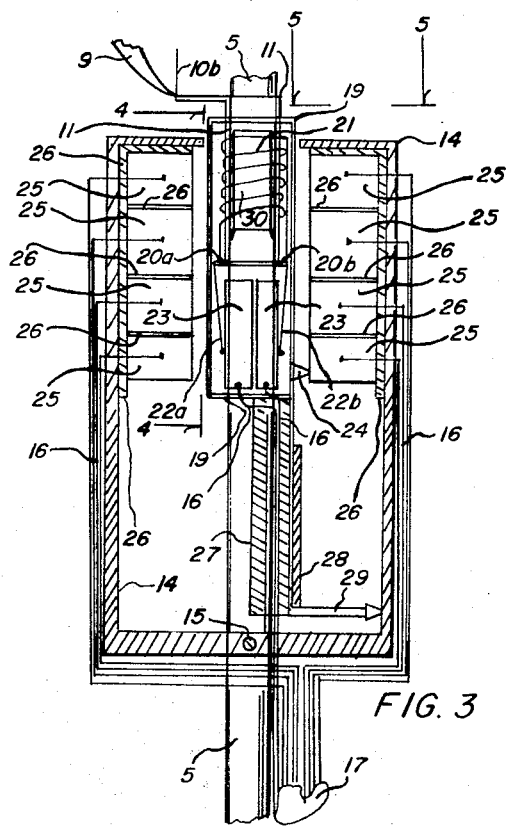
FIG. 3 illustrates a cross-sectional view of the present invention, taken along lines 3—3 as shown in FIG. 2.

Proceeding along with the discussion of the present invention as shown in FIG. 3, indicating collar 11 is able to rotate about mast 5 and also slide upward on mast 5. Sleeve 19 is fixed to indicator collar 11. Indicator collar 11 extends its length downward to the point to support the electrical standoff 20a and standoff 20b. Coil 21 is coiled around indicator collar 11 and is fixed to indicator collar 11. Spring 22a and spring 22b are fixed to the electrical standoff 20a and standoff 20b. Spring 22a and spring 22b are constructed a contact area on the end that makes contact with split tubing 23. Split tubing 23 is insulated but fixed to mast 5 and presents its conductive sides to spring 22a and spring 22b. Wires 16 is fixed to the conductive sides of split tubing 23. Electrical contactor 24 is fixed to sleeve 19 and sleeve 19 is fixed to indicator collar 11 and electrical contactor 24 is orientated in its movements by the upward sliding and rotating about mast 5 of indicating collar 11 which moves with the force of wind on fabric body 9. Electrical contactor 24 is spherical in shape and comes to a point to make physical contact with segments 25 which are fixed but insulated from housing 14 by insulator 26. Insulator 26 electrically insulates the segments from each other and the housing 14. Wires 16 are terminated within the housing and to each segment 25 in order that the wind direction can be indicated by electrical means. Half-sleeve 27 is fixed to sleeve 19 and is an extension of sleeve 19 and supports weight 28, which weight 28 can be made of lead or similar metal. Weight 28 is fixed to half-sleeve 27 in order that fabric body 9 returns to its normal position when the winds subside. Fixed to half-sleeve 27 is solid conductor 29 which spherical tip makes physical moving contact with the interior portion of housing 14 to insure proper electrical continuity in order that electrical contactor 24 will indicate the proper wind direction by electrical means. It is to be noted that there is electrical continuity between solid conductor 29 and electrical contactor 24. Set screw 15 secures housing 14 to mast 5. Ferrite core 30 fixed within mast 5 in a position that is relative to coil 21 when indicating collar 11 is in its normal position.

Figure 4:
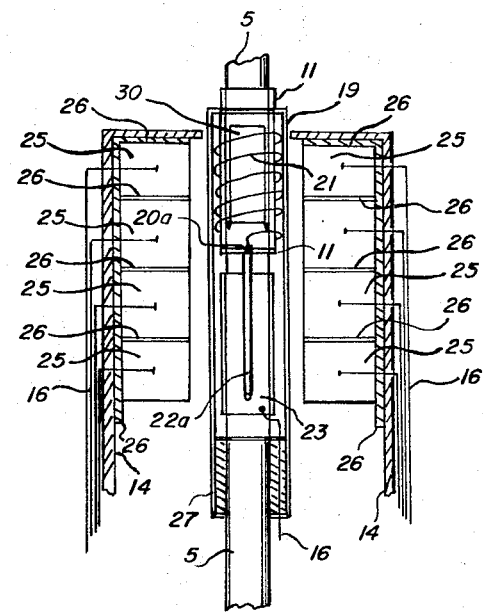
FIG. 4 illustrates a cross-sectional view of the present invention along lines 4—4 as shown in FIG. 3.

Further discussing the present invention, FIG. 4 shows the segments 25 are circular in arrangement within housing 14. Spring 22a is in physical contact with split tubing 23 and will remain in physical contact with split tubing 23 in its various movements whether the movement is vertical or rotational. Wires 16 to split tubing 23 enable high frequency alternating current to be applied to coil 21. The movement of indicator collar 11 upward on mast 5 and the resultant movement also of coil 21 will change the reactance of the high frequency alternating current because ferrite core 30 changes the reactance of the high frequency alternating current and this change in reactance can be made to indicate the wind velocity of appropriate equipment that will be assumed to be used in connection with the present invention.

Figure 5:
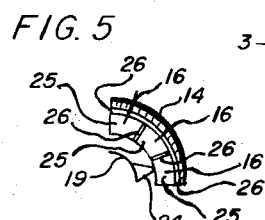
FIG. 5 illustrates a top view taken along lines 5—5 as shown in FIG. 3.

Further discussion of the present invention, FIG. 5 shows the top view to show the placement of insulator 26 between the segments 25 and housing 14 and between adjacent segments 25 in order that electrical contactor 24 will give the correct electrical indication relative to that position that is determined by indicator collar 11, which in turn is activated by fabric body 9. Wires 16 terminated within the housing to each segment 25 will give the correct indication of wind direction.

Assuming the wind is blowing in FIG. 2, the force of the wind will act upon fabric body 9 causing it to "fill". Rod 12 and cable 10a, cable 10b, cable 10c and cable 10d hold the shape of fabric body 9 in its proper position so that fabric body 9 will rotate about mast 5 in response to wind direction changes. Opening 13a and opening 13b lessen the erratic movement of fabric body 9 in that a portion of the wind will pass through the fabric body 9. Indicating collar 11 which is able to slide upward and also rotate about mast 5 will move in accordance to wind pressure upon fabric body 9.

Depending upon the velocity of the wind at any given moment and direction fabric body 9 causes indicator collar 11 to slide upward on mast 5 or rotate about mast 5 or perform both types of movement at the same time. Weight 28 returns sleeve 19 to its normal position. Movable collar 8 provides that fabric body 9 will rotate about mast 5 freely. Cable 10a, cable 10b, cable 10c and cable 10d direct the upward pull of fabric body 9 to indicator collar 11 in order that the movements are consistant and reflect the true position of wind direction and velocity. Rod 12 is needed to keep the shape of fabric body 9 in its capturing shape and will react to wind force.

Assuming again the wind is blowing and fabric body 9 is filled and indicator collar 11 is performing properly, electrical contactor 24 will make physical contact with one of segments 25. Solid conductor 29 is making physical contact with the interior of housing 14 at all times in order that electrical continuity is directed to electrical contactor 24. With electrical contactor 24 in physical contact with a segment 25, wires 16 which are terminated into segment 25 will electrically carry the current to jack 18. This would complete the wind direction indicator.

Assuming again the wind is blowing, and the previous movements of the fabric body 9 and indicator collar 11 are noted, wires 16 will deliver high frequency alternating current to split tubing 23. Spring 22a and spring 22b making contact with split tubing 23 will carry this current to electrical standoff 20a and electrical standoff 20b. At this junction at electrical standoff 20a and electrical standoff 20b is terminated the coil wires of coil 21. The movement upward of indicator collar 11 will present the upward movement of coil 21 and its relation to ferrite core 30 will change. This change can be recorded. This completes the velocity indicator.

Collar 7a and collar 7b position movable collar 8 on mast 5 with the base of mast 5 anchored in concrete 6 which might be an acceptable manner.

Set screw 15 secures housing 14 to mast 5. Wires 16 from segments 25, which segments 25 are individually insulated from each other by insulator 26 form a harness 17 and terminate at jack 18.

Half-sleeve 27 is an extension of sleeve 19 and supports the weight 28 and also solid conductor 29 so that the present invention will operate properly.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Mast mounted apparatus for determining the strength and direction of the wind, said apparatus comprising:
   a. a fabric body rotatably secured to the mast and rotatable to a downwind position from the mast in response to the wind, said fabric body varying in shape in response to the force of the wind;
   b. an electrical contactor for determining the rotational position of said fabric body and reflective of the direction of the wind;
   c. a ferrite core surrounded by a movable coil, said coil including means for transmitting an alternating current through said coil;
   d. means responsive to the change in shape of said fabric body for repositioning said coil with respect to said ferrite core to vary the reactance of said ferrite core commensurate with the change in shape of said fabric body; whereby, both the force of the wind and the direction of the wind is determinable.

2. Apparatus for determining both the direction and force of a wind impinging upon said apparatus, said apparatus comprising:
   a. a mast extending upwardly from a foundation into the path of the wind;
   b. a rotatable collar circumscribing said mast, said collar being longitudinally fixed to said mast;
   c. a rotatable indicator collar circumscribing said mast, said indicator collar being movable along the longitudinal axis of said mast;
   d. a billowable fabric body attached intermediate said collar and said indicator collar, said fabric body being pivotably positioned downwind of said mast in response to the wind and billowing to a degree commensurate with the force of the wind to draw said indicator collar toward said collar in proportion to the amount of billow;
   e. a ferrite core mounted upon said mast below said indicator collar;
   f. a coil disposed about said ferrite core, said coil being positionally responsive to longitudinal movement of said indicator collar;
   g. electrical conductor means for transmitting an alternating current through said coil;
   h. a plurality of electrically conductive segments disposed about said mast, said segments being in fixed relationship with said mast;
   i. contactor means for electrically contacting one of said segments, said contactor means being rotatable with said indicator collar and contacting one of said segments to reflect the rotational position of said indicator collar; and j. electrical means for conveying a change in reactance caused by relative movement of said ferrite core and said coil and for identifying one of said segments in electrical contact with said contactor means; whereby, the force of the wind is determinable by the amount of billow of said fabric causing a change in reactance and the direction of the wind is determinable by said segment in electrical contact with said contactor means.

3. The apparatus as set forth in claim 2 including a weight connected to said indicator collar for biasing said indicator collar in a downward direction.

4. The apparatus as set forth in claim 3 further including spring biased electrical spring means interconnecting said coil and said electrical conductor means to accommodate longitudinal movement of said coil.

5. The apparatus as set forth in claim 2 wherein said fabric body is in the shape of a diamond having a vertical and a horizontal axis.

6. The apparatus as set forth in claim 5 including a rod extending intermediate the horizontally aligned apices of said diamond shaped fabric body.

7. The apparatus as set forth in claim 6 further including pressure relief holes disposed within said fabric body to stabilize said fabric body.

8. The apparatus as set forth in claim 2 wherein said electrically conductive segments are circularly mounted about said mast.

9. The apparatus as set forth in claim 8 including a plurality of tiers of said electrically conductive segments, each said tier being electrically insulated from an adjacent tier such that vertical movement of said contactor means in response to vertical movement of said indicator collar contacts one of said segments within one of said tiers; whereby, each tier is representative of a range of wind force.

* * * * *